United States Patent
Filippi et al.

(10) Patent No.: US 7,897,130 B2
(45) Date of Patent: Mar. 1, 2011

(54) PROCESS FOR SYNTHESIS GAS PRODUCTION

(75) Inventors: Ermanno Filippi, Castagnola (CH); Geoffrey Frederick Skinner, Berkshire (GB)

(73) Assignee: Ammonia Casale S.A. (CH)

( * ) Notice: Subject to any disclaimer, the term of this patent is extended or adjusted under 35 U.S.C. 154(b) by 593 days.

(21) Appl. No.: 11/368,828

(22) Filed: Mar. 6, 2006

(65) Prior Publication Data

US 2006/0198781 A1 Sep. 7, 2006

(30) Foreign Application Priority Data

Mar. 6, 2005 (EP) .................................... 05004894

(51) Int. Cl.
*B01D 47/00* (2006.01)
*C01C 1/04* (2006.01)

(52) U.S. Cl. ......... 423/359; 423/210; 423/351; 423/352; 423/387; 422/206

(58) Field of Classification Search .................. 422/206, 422/190; 252/374, 376; 423/359, 210, 351, 423/352, 387; 564/69
See application file for complete search history.

(56) References Cited

U.S. PATENT DOCUMENTS

| 4,180,553 A | * | 12/1979 | Null et al. | ...................... 423/359 |
| 4,549,890 A | | 10/1985 | Bligh | |
| 4,780,298 A | * | 10/1988 | Kowal | ............................ 423/359 |
| 6,025,403 A | * | 2/2000 | Marler et al. | .................. 518/703 |
| 6,190,632 B1 | * | 2/2001 | Shah et al. | ..................... 423/352 |

FOREIGN PATENT DOCUMENTS

| DE | 11 22 087 B | 1/1962 |
| DE | 15 67 715 A1 | 7/1970 |
| GB | 1 156 003 A | 6/1969 |

* cited by examiner

*Primary Examiner* — Melvin C Mayes
*Assistant Examiner* — Melissa Stalder
(74) *Attorney, Agent, or Firm* — Akerman Senterfitt

(57) ABSTRACT

A process for obtaining a synthesis gas (GS) at a predetermined high pressure corresponding to the ammonia synthesis pressure, in which there are hydrogen and nitrogen in a 3/1 molar ratio, comprising the steps of feeding a continuous flow of natural gas to a primary reforming step (RP) with steam and to a subsequent secondary reforming step (RS) with excess air obtaining a gaseous flow (GF) comprises hydrogen, excess nitrogen with respect to said molar ratio, undesired substances such as impurities and inerts and subjects said gaseous flow to a purification step comprising cryogenic rectification in a separator unit (S) obtaining a continuous flow of synthesis gas (GS) comprising hydrogen and nitrogen in a 3/1 molar ratio, and to a subsequent compression step up to a pressure value required for ammonia synthesis.

9 Claims, 2 Drawing Sheets

PROCESS FOR SYNTHESIS GAS PRODUCTION

FIELD OF APPLICATION

The present invention refers, in its most general aspect, to a process for synthesis gas production intended to produce ammonia in which a continuous flow of natural gas, for example methane, is subjected to a reforming step with steam (primary reforming), then to a reforming step with excess air (secondary reforming) and then to a purification step comprising cryogenic rectification of the gaseous flow produced in said secondary reforming step.

In particular, the present invention refers to the cryogenic purification step of a process of the aforementioned type, to obtain pure synthesis gas at a predetermined pressure.

PRIOR ART

It is known that to obtain synthesis gas (H2+N2) intended for ammonia production, a continuous flow of natural gas, in particular methane (CH4), is subjected to reforming treatments, firstly with steam and then with excess air, called primary reforming and secondary reforming, respectively.

The gaseous product thus obtained and essentially comprising hydrogen, nitrogen, carbon oxide and dioxide, argon and water, is purified through cryogenic rectification, as shall become clear in the rest of the description.

In the secondary reforming step, in order to promote the combustion of the gaseous product coming from the primary reforming, an excess amount of air with respect to the amount necessary to determine the desired 3/1 molar ratio between hydrogen and nitrogen is fed.

Generally, the aforementioned excess air used in the secondary reforming is such as to determine a molar ratio between hydrogen and nitrogen of 2.5-2/1, therefore a gaseous flow comprising a nitrogen excess equal to 40%-50% in moles with respect to the amount of nitrogen required in the ammonia synthesis.

The excess nitrogen is then generally taken away in the aforementioned cryogenic purification step.

In order to reach the temperature value that allows cryogenic purification, generally a value around 120° C., it is not sufficient to cool the gaseous flow coming from the secondary reforming through simple heat exchange, but a substantial sharp increase in cooling is necessary and this is generally obtained through an appropriate expansion of said gaseous flow.

Although advantageous from different points of view, a process of this type is not without drawbacks, the main one of which consists of the aforementioned expansion step of the gaseous flow coming from the secondary reforming.

Indeed, for the subsequent ammonia synthesis, the synthesis gas must be at a predetermined and very precise high pressure for which reason the pressure lost in the expansion must subsequently be recovered in a compression step.

Such an essential recovery of pressure means a compression of the gaseous fluid from a particularly low pressure value, generally around 20 bar as determined by the aforementioned expansion, and this negatively influences the cost-effectiveness of the entire process.

SUMMARY OF THE INVENTION

The problem underlying the present invention is that of providing a process of the type considered above, for obtaining a synthesis gas suitable for being used in ammonia production, i.e. a synthesis gas at a predetermined pressure in which hydrogen and nitrogen are in a molar ratio of 3/1, and in which the cryogenic purification step of the gaseous flow coming from the secondary reforming can be carried out completely overcoming the quoted drawbacks with reference to the prior art.

This problem is solved by a process for synthesis gas production according to the present invention, in which a continuous flow of natural gas, for example methane, is subjected to a primary reforming step with steam and to a subsequent secondary reforming step with excess air obtaining a gaseous flow comprising hydrogen, nitrogen, carbon oxides, argon, water and similar impurities and in which said gaseous flow is subjected to a purification step comprising cryogenic rectification in a separator unit obtaining a continuous flow of synthesis gas comprising hydrogen and nitrogen in a 3/1 molar ratio, and to a subsequent compression step up to a pressure value required for ammonia synthesis, characterized in that it comprises the further steps of:

continuously separating a portion of said synthesis gas thus obtained and expanding said portion obtaining a cooled portion;

placing said cooled portion in heat exchange relationship with said gaseous flow to be purified.

Preferably, said portion of synthesis gas is separated after the compression step of the flow of synthesis gas.

Advantageously, the aforementioned heat exchange takes place inside the aforementioned separator unit.

Again advantageously, said portion of synthesis gas is separated in an amount between 10% and 25% of the flow rate of the flow of synthesis gas, preferably an amount equal to 20% of the flow rate.

The features and advantages of the process according to the present invention shall become clear from the detailed description of an embodiment thereof, made hereafter with reference to the attached drawings for indicative and not limiting purposes.

DETAILED DESCRIPTION OF A PREFERRED EMBODIMENT

Figure 1:
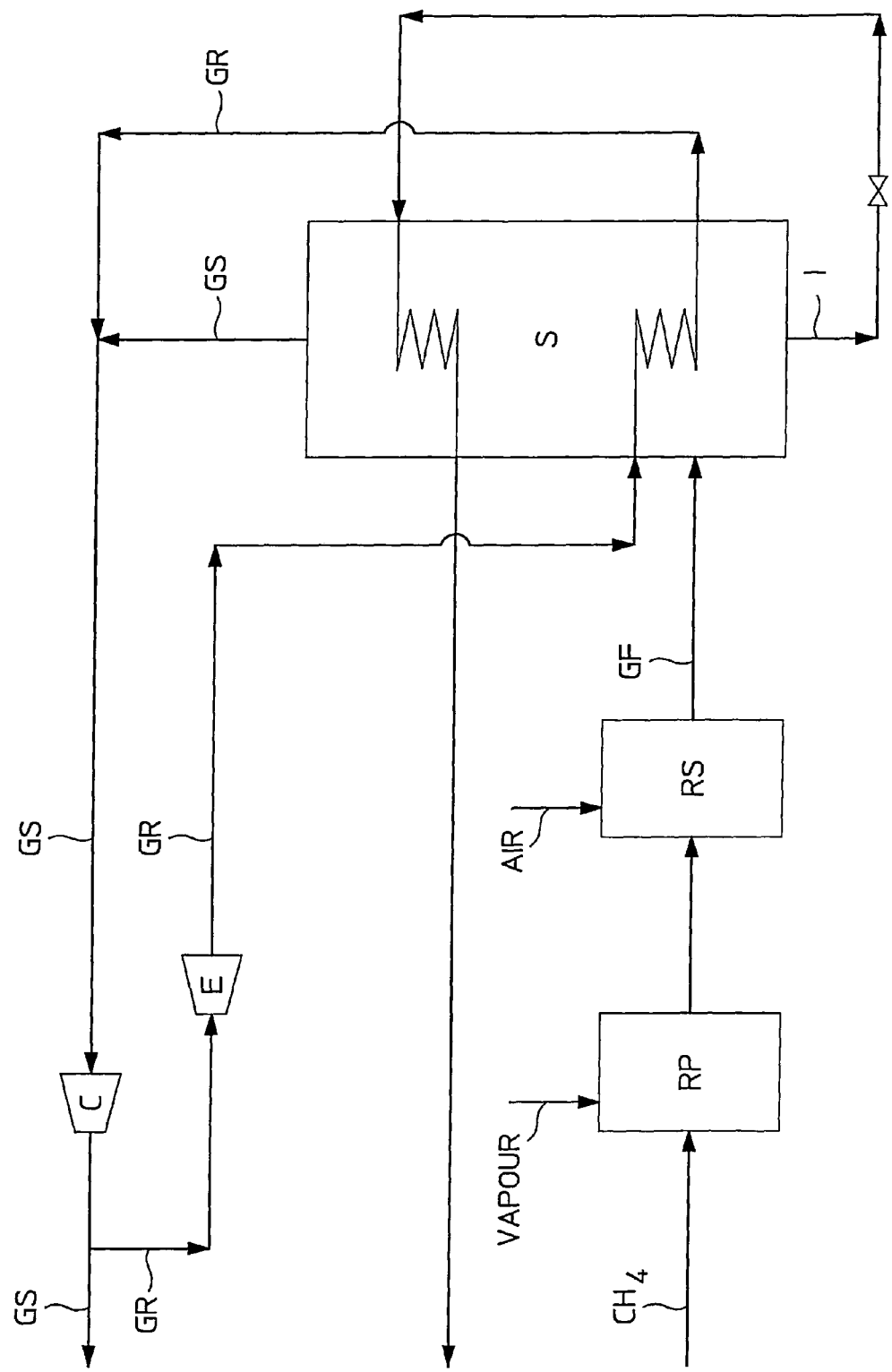
FIG. 1 shows a schematic diagram of the process for obtaining synthesis gas in accordance with the present invention according to a first embodiment.

With reference to FIG. 1, an embodiment of the process according to the invention for obtaining a synthesis gas GS at a predetermined high pressure value, generally between 25 and 30 bar, comprising an amount of hydrogen (H2) and of nitrogen (N2) in a 3/1 molar ratio which is particularly suitable for being used in the production of ammonia (NH3) shall now be described.

In a stationary operating condition, a gaseous flow of methane (CH4) is sent in succession to a first conventional reforming step with steam, or primary reforming RP, and then to a second conventional reforming step with excess air, or secondary reforming RS.

The gaseous flow GF in output from the secondary reforming RS, comprising hydrogen, nitrogen, impurities and inerts such as carbon oxides, water, argon, is then subjected to a purification step in a separator unit S comprising cryogenic rectification, from which are obtained in output: as head product the synthesis gas GS comprising hydrogen and nitrogen in a 3/1 molar ratio and as tail product a current I comprising the aforementioned impurities and inerts, respectively.

The separator unit S advantageously comprising a dephlegmator, can alternatively consist of an assembly comprising a cooling column and a reflow condenser, or of a purifier known as Braun Purifier™, or similar known apparatuses, suitable for obtaining a purification comprising cryogenic rectification.

In output from the aforementioned separator unit S, the synthesis gas GS is sent to a compression step, in a respective compressor C, from which synthesis gas compressed to a pressure value close to the ammonia synthesis pressure is obtained.

In accordance with the invention, a portion GR of the aforementioned synthesis gas GS is separated from the compressed flow, then sent to an expansion step in an expander E, where it is expanded up to a pressure value substantially equal to the inlet (intake) pressure of the compressor C, i.e. about 25-30 bar, after such an expansion step obtaining a cooled portion of synthesis gas.

Such a cooled portion GR of synthesis gas is thus sent to a heat exchange step, indirect in the example of FIG. 1, with the gaseous flow GF to be purified. Such a heat exchange provides the gaseous flow GF with the cooling necessary to obtain the cryogenic purification.

Preferably, such a heat exchange step takes place in the aforementioned separator unit S in which the cooled portion GR is sent after the expansion step.

Preferably, the aforementioned portion GR of synthesis gas is separated in an amount between 10% and 25% of the flow rate of the flow of synthesis gas GS, more preferably in an amount equal to 20% of the flow rate.

Such a separated portion, after the aforementioned heat exchange, is combined with the synthesis gas GS in output from the separator unit S, and with it it is sent to the compression step.

According to an alternative embodiment of the example of FIG. 1, not represented, the heat exchange step between the cooled portion GR of synthesis gas and the gaseous flow GF to be purified can be of the direct type, i.e. in which the cold gas GR is mixed with the gaseous flow GF to be purified.

Figure 2:
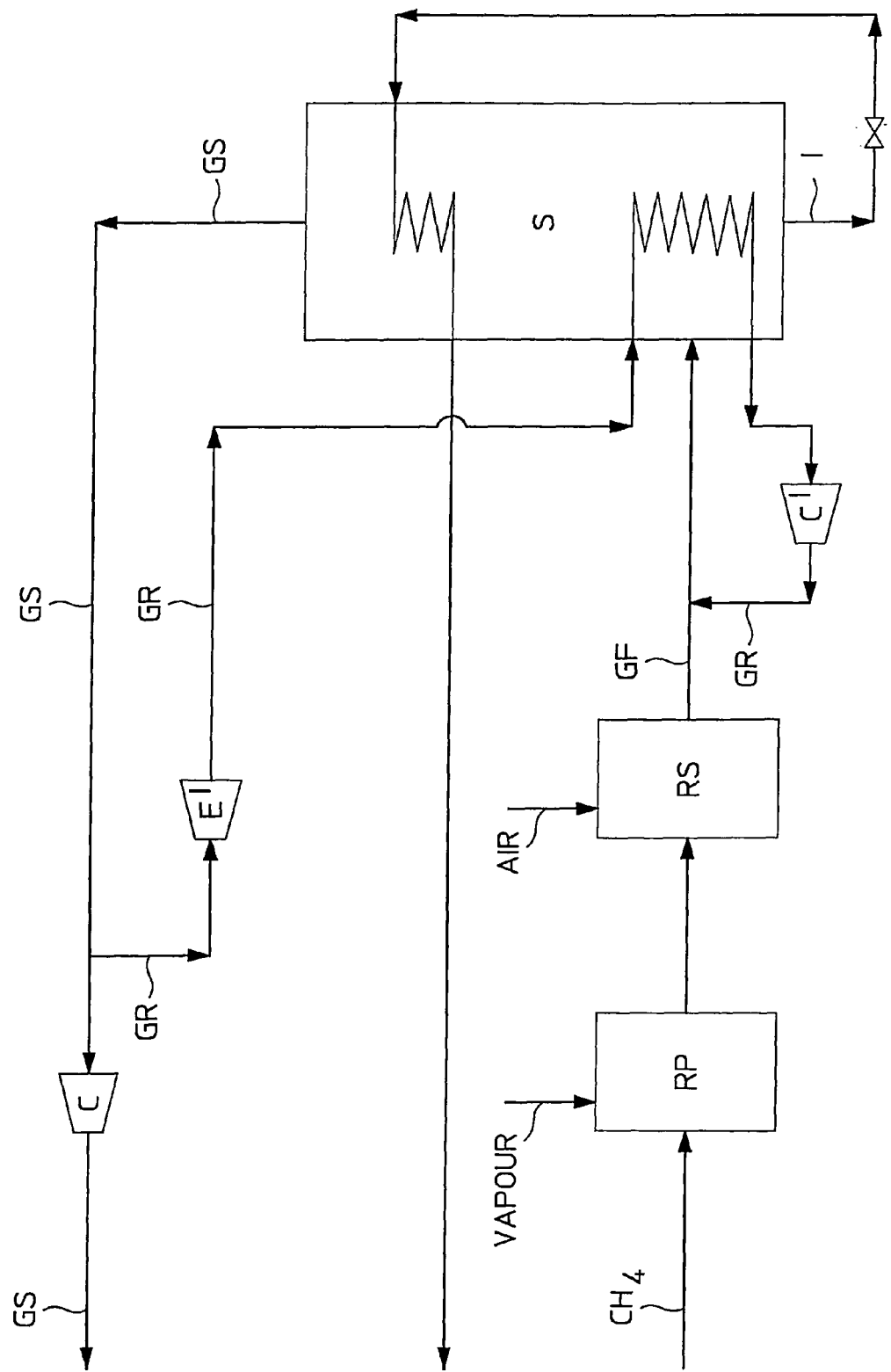
FIG. 2 shows a schematic diagram of the process for obtaining synthesis gas in accordance with the present invention according to a further embodiment.

With reference to FIG. 2, a second embodiment of the process for obtaining synthesis gas in accordance with the present invention is schematically shown. In this figure, the elements operatively analogous to those of the first embodiment of the process (FIG. 1) are indicated with the same reference numeral and, for the sake of brevity, the detailed description thereof is not repeated.

According to this further embodiment of the process, the portion GR of the aforementioned synthesis gas GS is separated upstream of the compression step in the compressor C, in output from the separator unit S. The portion GR is then sent to an expansion step in an expander E', where it is expanded from a pressure of about 25-30 bar up to a value for example between 10 and 15 bar, after such an expansion obtaining a cooled portion GR of synthesis gas.

In the same way as the example of FIG. 1, the portion GR of synthesis gas thus cooled is then sent to a heat exchange step (indirect) with the gaseous flow GF to be purified, preferably in the aforementioned separator unit S. Such a heat exchange provides the gaseous flow GF with the cooling necessary to obtain the cryogenic purification.

The separated portion GR, after the aforementioned heat exchange, is sent to a compression step, in a respective compressor C', where it is compressed compressed to a pressure value substantially identical to the pressure of the gaseous flow GF in output from the secondary reforming RS (for example 25-30 bar). The compressed portion GR of synthesis gas is then combined with said gaseous flow GF and with it it is sent to the purification step in the separator unit S.

The main advantage of the process according to the present invention lies in the possibility of being able to cool down the gaseous flow GF to be purified to a temperature value such as to allow an effective cryogenic purification at the same time maintaining the gaseous flow at a high pressure value.

The subsequent compression step, foreseen to obtain synthesis gas at a pressure value corresponding to the ammonia production pressure, shall thus be less expensive having to compress the synthesis gas from an initially high pressure value.

This is made possible thanks to the fact that to obtain the cooling of the gaseous flow GF to be purified, one does not have to carry out its integral expansion, but an expansion of a separated portion GR of the purified synthesis gas GS and heat exchange thereof with the gaseous flow GF to be purified.

Advantageously, the process according to the invention allows a flow of air to be fed to the secondary reforming RS such as to determine, in the gaseous flow GF to be purified, an excess of nitrogen lower than that described in the prior art, at the same time allowing effective cryogenic purification.

In particular, such excess nitrogen is between 10% and 25% in moles with respect to the aforementioned molar ratio between hydrogen and nitrogen, preferably equal to 15% in moles.

Again advantageously, the process according to the invention is suitable to be used in the case of revamping of an industrial plant, in other words in the case of an increase of capacity of an existing plant used for synthesis gas production and comprising a cryogenic purification.

In the case of revamping, the actuation of the process according to the invention in a plant initially operating according to what it is described in the prior art, achieves the advantage of limiting changes to the plant against an increase in capacity.

Considering an increase in capacity in a plant it should be observed that, if one operates according to the known process one is obliged to intervene in the expansion step, on a corresponding expander, or turbine, replacing it with one of greater capacity having to expand a gaseous flow to be purified of greater flow rate.

Carrying out the process according to the invention, the expander must not be replaced with one of greater capacity but, on the contrary, with an expander of substantially lower capacity, therefore more cost-effective, since it is intended for the expansion of a portion GR of the purified synthesis gas.

Furthermore, considering that the flow of air fed to the secondary reforming must be compressed to a pressure value of about 35 bar, it should be observed that despite the increase in capacity, operating with a lower excess of air a saving is made on the compression work which obviously is proportional to the flow rate of the flow of air to be compressed.

A further advantage can be clearly seen if one considers that the energy consumption required in the cryogenic purification step remains substantially unvaried against an increase in capacity, since such an increase is compensated by a lower amount of nitrogen that must be taken away from the gaseous flow to be purified.

Of course, a man skilled in the art can bring numerous modifications to the invention described above, in order to satisfy contingent and specific requirements, all of which are covered by the scope of protection of the invention, as defined by the following claims.

The invention claimed is:

1. A process for obtaining a synthesis gas at a predetermined high pressure corresponding to an ammonia synthesis pressure, in which there are hydrogen and nitrogen in a 3/1 molar ratio, comprising the steps of:
    feeding a continuous flow of natural gas to a primary reforming step with steam and to a subsequent secondary reforming step with excess air obtaining a gaseous flow to be purified comprising hydrogen, excess nitrogen with respect to said molar ratio, undesired substances such as impurities and inerts;
    purifying said gaseous flow in a purification step comprising cryogenic rectification in a separator unit obtaining a continuous flow of synthesis gas comprising hydrogen and nitrogen in a 3/1 molar ratio;
    compressing said flow of synthesis gas in a subsequent compression step up to a pressure value required for ammonia synthesis;
    continuously separating a portion of said synthesis gas leaving said compression step, which is compressed up to the pressure value required for ammonia synthesis, and expanding said portion of compressed synthesis gas to obtain a cooled portion; and
    placing said cooled portion in heat exchange relationship with said gaseous flow to be purified.

2. The process according to claim 1, wherein said portion of synthesis gas is separated after the compression step of the flow of synthesis gas.

3. The process according to claim 1, wherein said portion of synthesis gas is separated upstream of said compression step of the flow of synthesis gas, and wherein said cooled portion, once said heat exchange has been carried out with said gaseous flow to be purified, is subjected to a compression step to a pressure value substantially identical to the pressure of said gaseous flow to be purified and to a subsequent step in which said compressed portion is combined with said gaseous flow to be purified and is sent to said purification step in said separator unit with said gaseous flow.

4. The process according to claim 1, wherein said heat exchange takes place inside said separator unit.

5. The process according to claim 1, wherein said portion of synthesis gas is separated in an amount between 10% and 20% of a flow rate of the flow of synthesis gas.

6. The process according to claim 1, wherein said gaseous flow to be purified contains excess nitrogen with respect to said molar ratio in an amount between 10% and 25% in moles.

7. The process according to claim 1, wherein said process is used after revamping of an existing plant for synthesis gas production, in which plant a corresponding process is carried out comprising a purification step comprising cryogenic rectification of a gaseous flow comprising excess nitrogen with respect to said molar ratio.

8. The process according to claim 5, wherein said portion of the synthesis gas is separated in an amount equal to 15% of the flow rate of the flow of synthesis gas.

9. The process according to claim 6, wherein said gaseous flow to be purified contains excess nitrogen with respect to said molar ratio in an amount equal to 15% in moles.

* * * * *